United States Patent
Serai et al.

(10) Patent No.: US 8,011,459 B2
(45) Date of Patent: Sep. 6, 2011

(54) INVERTED WHEEL TYPE MOVING BODY AND METHOD OF CONTROLLING SAME

(75) Inventors: Takuya Serai, Toyota (JP); Yoshiyuki Senba, Toyota (JP); Koji Yamada, Toyota (JP); Takashi Izuo, Toyota (JP); Chisao Hayashi, Aichi-gun (JP); Mitsuo Koide, Nagoya (JP); Kazutoshi Sukigara, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/258,002

(22) Filed: Oct. 24, 2008

(65) Prior Publication Data
US 2009/0108553 A1    Apr. 30, 2009

(30) Foreign Application Priority Data
Oct. 25, 2007   (JP) ................... 2007-278016

(51) Int. Cl.
   E02F 3/76   (2006.01)

(52) U.S. Cl. .......... 180/8.2; 180/218; 180/7.1; 180/6.5; 180/282; 280/5.502; 280/513

(58) Field of Classification Search ............. 180/218, 180/7.1, 6.5, 282
See application file for complete search history.

(56) References Cited

U.S. PATENT DOCUMENTS

| | | | | |
|---|---|---|---|---|
| 5,975,225 A * | 11/1999 | Kamen et al. | ............. | 180/7.1 |
| 6,571,892 B2 * | 6/2003 | Kamen et al. | ............. | 180/8.2 |
| 7,363,993 B2 * | 4/2008 | Ishii | ............. | 180/7.1 |
| 2005/0121238 A1 * | 6/2005 | Ishii | ............. | 180/65.1 |

FOREIGN PATENT DOCUMENTS

| | | |
|---|---|---|
| JP | 04-201793 A | 7/1992 |
| JP | 2004-291799 A | 10/2004 |
| JP | 3722493 | 9/2005 |
| JP | 2006-001384 A | 1/2006 |
| JP | 2006-205839 A | 8/2006 |
| JP | 2006-306374 A | 11/2006 |
| JP | 2006-306375 A | 11/2006 |
| JP | 2007-176399 A | 7/2007 |
| JP | 2007-203965 A | 8/2007 |

* cited by examiner

Primary Examiner — Tony H. Winner
Assistant Examiner — Jacob Knutson
(74) Attorney, Agent, or Firm — Kenyon & Kenyon LLP

(57) ABSTRACT

To provide an inverted wheel type moving body capable of improving the operability, and a method of controlling the same. An inverted wheel type moving body in accordance with one aspect of the present invention includes motors 34 and 36 for rotationally driving a right driving wheel 18 and a left driving wheel 20 respectively, a passenger seat 74 rotationally supported on mounts 26 and 28 through swing arms 17 and 19, a passenger seat drive motor 70 for driving the passenger seat 74, a control portion 80 for determining whether the manipulation amount exceeds the threshold value or not, and a motor driver 70a for control the passenger seat drive motor 70 such that the passenger seat 74 is moved in accordance with the manipulation amount when the manipulation amount does not exceed the threshold value and the movement of the passenger seat 74 is restored after the manipulation amount exceeds the threshold value.

9 Claims, 8 Drawing Sheets

INVERTED WHEEL TYPE MOVING BODY AND METHOD OF CONTROLLING SAME

BACKGROUND OF THE INVENTION

1. Field of the Invention

The present invention relates to an inverted wheel type moving body and a method of controlling the same.

2. Description of Related Art

An inverted wheel type moving body (an inverted pendulum type robot) such as an inverted two-wheel vehicle is typically controlled to travel in such a manner that the position of the center-of-mass is constantly corrected to maintain the stable state by driving left and right driving wheels. For example, Japanese Unexamined Patent Application Publication No. 4-201793 discloses an inverted wheel type moving body (unstable traveling apparatus) having getting-on decks on which the passenger gets on. This inverted wheel type moving body makes acceleration and deceleration, for example, depending on the inclination angle of the getting-on decks. Therefore, the passenger shifts the center-of-mass toward the direction to which the passenger wants to travel, so that the getting-on decks is inclined. In this manner, it can travel in accordance with the manipulation of the passenger.

Furthermore, Japanese Unexamined Patent Application Publication No. 2006-1384 discloses a traveling control apparatus for an inverted wheel type moving body (unstable vehicle) having a seat arranged above the wheels. This control apparatus is operated by a joystick. That is, a command value is inputted by inclining the joystick. The wheels are rotated based on this command value. In this manner, it can travel in accordance with the manipulation of the passenger.

Incidentally, the position of the center-of-mass of the upper body is uniquely determined based on the magnitude of the acceleration in such an inverted wheel type moving body as the moving body is controlled such that it is maintained at the inverted state during acceleration or deceleration. Consequently, the upper body is inclined in the traveling direction during acceleration and inclined in the opposite direction to the traveling direction during deceleration. Accordingly, the upper body must be inclined, after the manipulation of the operator is detected, in order to accelerate. Specifically, when an operator initiates operation for acceleration by using an operation system such as a joystick, the wheels move the opposite direction to the traveling direction. That is, the wheels, firstly, rotate in the opposite direction to the traveling direction to create the state where the upper body is inclined in the traveling direction. Then, the wheels are reversed, and rotate in the traveling direction. Consequently, the moving body starts acceleration. In this manner, the moving body 100 travels in the traveling direction in accordance with the manipulation.

Consequently, a delay occurs between when the manipulation is carried out and when the moving body actually starts to travel in an inverted wheel type moving body in the related art. In other words, the wheels need to be rotated in the opposite direction to the traveling direction, and then to reversed to the traveling direction. Therefore, a delay occurs before the moving body starts to move in response to the operator's input. Accordingly, there has been a problem that it is very difficult to improve the operability of an inverted wheel type moving body in the related art.

As described above, there has been a problem that it is very difficult to improve the operability of an inverted wheel type moving body in the related art. In one aspect, the present invention has been made to solve the above-mentioned problem. One of the objects of the present invention is to provide an inverted wheel type moving body capable of improving the operability, and a method of controlling the same.

SUMMARY OF THE INVENTION

In accordance with a first aspect of the present invention, an inverted wheel type moving body to travel in accordance with a manipulation amount manipulated by an operator includes: a chassis to rotatably support at least one wheel; a first drive portion to rotatably drive the wheel; a body portion rotatably supported on the chassis through a support member; a second drive portion provided on the support member to drive the body portion; a decision portion to determine whether the manipulation amount exceeds a threshold value or not; a first control portion to carry out feedback control on the first drive portion such that the first drive portion follows a target control value corresponding to the manipulation amount while maintaining the inverted wheel type moving body at the inverted state; and a second control portion to control the second drive portion such that the body portion is moved in accordance with the manipulation amount when the manipulation amount does not exceed the threshold value and the movement of the body portion is restored after the manipulation amount exceeds the threshold value. In this structure, the rotation of the wheel is restricted when the manipulation amount does not exceed the threshold value. In this manner, the body portion can be inclined in accordance with the traveling direction as the moving body accelerates. Therefore, the moving body can accelerate speedily, and the operability can be improved.

In accordance with a second aspect of the present invention, a method of controlling an inverted wheel type moving body, the inverted wheel type moving body including a chassis to rotatably support at least one wheel, a first drive portion to rotatably drive the wheel, a body portion rotatably supported on the chassis through a support member, and a second drive portion provided on the support member to drive the body portion, the inverted wheel type moving body carrying out feedback control on the first drive portion such that the first drive portion follows a target control value corresponding to the manipulation amount while maintaining the inverted wheel type moving body at the inverted state, the method of controlling the inverted wheel type moving body includes: a step for determining whether the manipulation amount exceeds a threshold value or not; and a step for moving the body portion in accordance with the manipulation amount when the manipulation amount does not exceed the threshold value and restoring the movement of the body portion after the manipulation amount exceeds the threshold value. In this structure, the rotation of the wheel is restricted when the manipulation amount does not exceed the threshold value. In this manner, the body portion can be inclined in accordance with the traveling direction as the moving body accelerates. Therefore, the moving body can accelerate speedily, and the operability can be improved.

One of the objects of the present invention is to provide an inverted wheel type moving body capable of improving the operability, and a method of controlling the same.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

A moving body in accordance with this embodiment of the present invention is an inverted wheel type moving body that travels by using the inverted pendulum control. The moving body travels to the desired place by driving the wheels that contact with the ground. In addition, the moving body can be maintained at an inverted state by driving the wheels in response to an output from a gyro-sensor or the like. Furthermore, the moving body travels in accordance with the manipulation amount manipulated by an operator while maintaining the inverted state.

Figure 1:
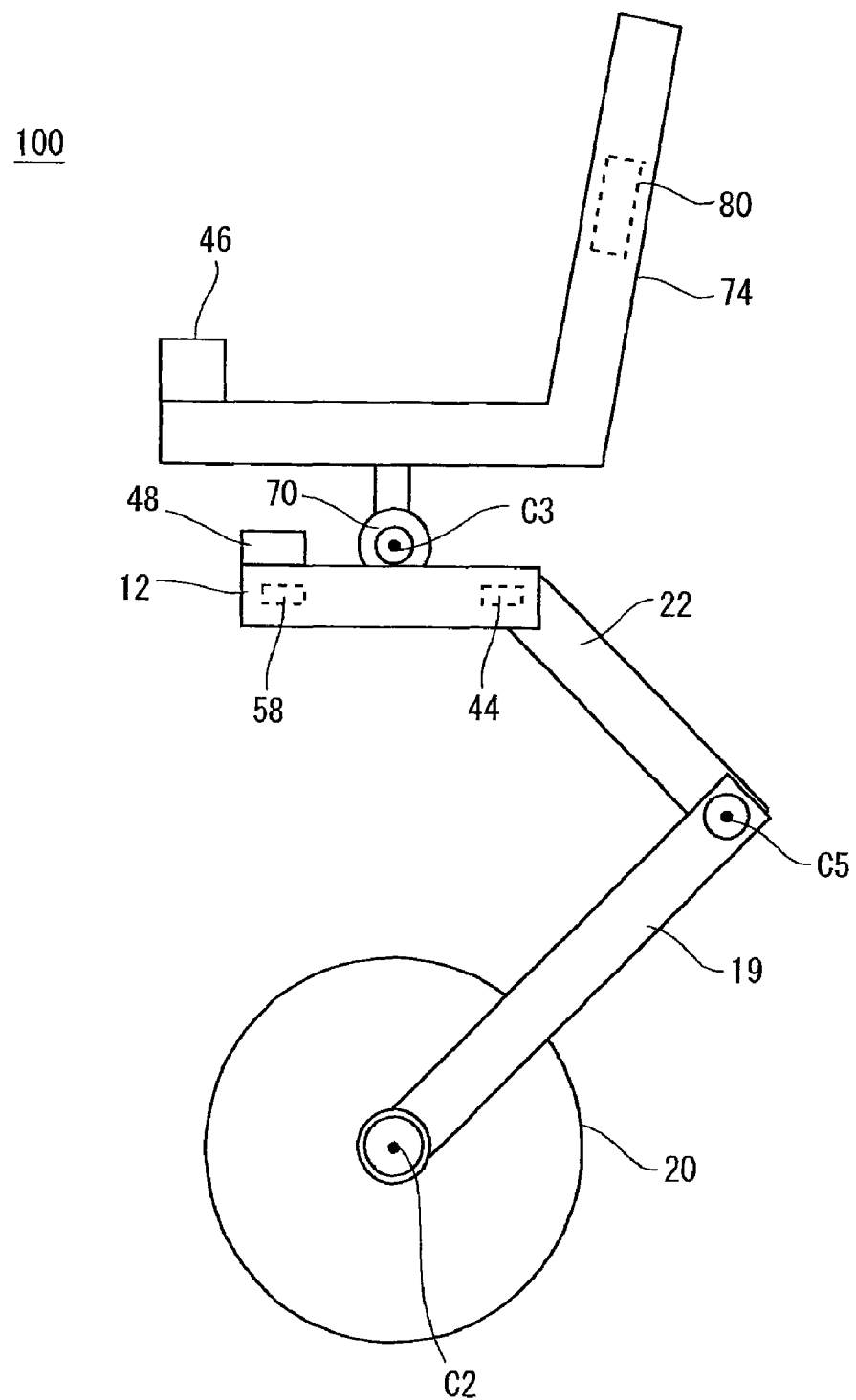
FIG. 1 is a side view showing the structure of a moving body in accordance with an embodiment of the present invention.

The structure of a moving body 100 in accordance with this embodiment of the present invention is explained hereinafter with reference to FIGS. 1 and 2. FIG. 1 is a schematic side view showing the structure of a moving body 100, and FIG. 2 is a schematic front view showing the structure of the moving body 100.

Figure 2:
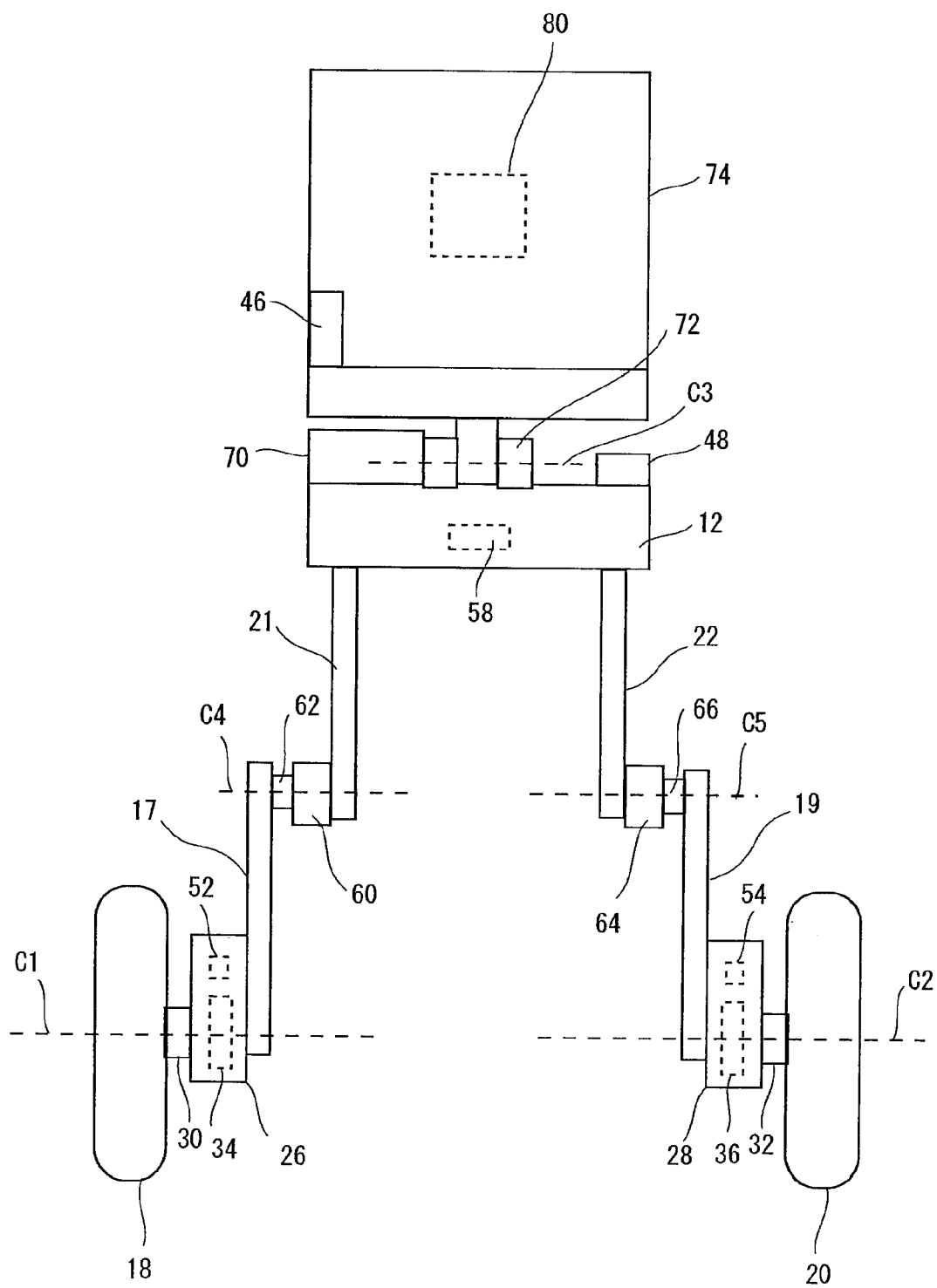
FIG. 2 is a front view showing the structure of a moving body in accordance with an embodiment of the present invention.

As shown in FIG. 2, the moving body 100 is an inverted wheel type moving body (traveling body), and includes a right driving wheel 18, a left driving wheel 20, a right swing arm 17, a left swing arm 19, and a body 12. The body 12 is the upper body portion of the moving body 100 arranged above the right driving wheel 18 and the left driving wheel 20. In the following explanations, the traveling direction of the moving body 100 (the direction perpendicular to the paper in which FIG. 2 is drawn) is referred as "front-back direction", and the direction perpendicular to the front-back direction in the horizontal plane is referred as "left-right direction (transverse direction)". Therefore, FIG. 2 shows the moving body 100 as viewed from the front side in the traveling direction, and FIG. 1 shows the moving body 100 as viewed from the left side.

The right swing arm 17 and the left swing arm 19 adjust the height of the moving body while it is traveling. Furthermore, the inclination angle of the body 12 in the left-right direction with respect to the ground can be also adjusted by driving either one or both of the swing arms. For example, assume a situation in which only the right driving wheel 18 runs on a step while the moving body is traveling on the level ground, or a situation in which the moving body is traveling from the level ground to the inclined ground where the right side is higher than the left side. In such a situation, the right driving wheel 18 is placed in a higher position than the left driving wheel 20 is. Therefore, the right driving wheel 18 is brought closer to the body 12 by driving the joint of the right swing arm 17. As a result, the distance by which the right driving wheel 18 is higher than left driving wheel 20 can be absorbed, and therefore the body 12 can be adjusted to the level position in the traverse direction (left-right direction).

A right mount 26 is fixed to the side end of the right swing arm 17, and rotatably supports the right driving wheel 18 through an axle 30. The right driving wheel 18 is fixed on the rotation axis C1 of a right wheel drive motor 34 through the axle 30. The right wheel drive motor 34 is fixed within the right mount 26, and serves as a wheel drive portion (actuator).

A left mount 28 is fixed to the side end of the left swing arm 19, and rotatably supports the left driving wheel 20 through an axle 32. The left driving wheel 20 is fixed on the rotation axis C2 of a left wheel drive motor 36 through the axle 32. The left wheel drive motor 36 is fixed within the left mount 28, and serves as a wheel drive portion (actuator). Both the right driving wheel 18 and the left driving wheel 20 contact with the ground, and constitute a pair of wheels that rotate on roughly the same axis. The moving body 100 travels by the rotations of the right driving wheel 18 and the left driving wheel 20. The right mount 26 and the left mount 28 constitutes the chassis that rotatably supports the left and right driving wheels.

The right wheel drive motor 34 and the left wheel drive motor 36 may be, for example, servo-motors. Incidentally, the actuators for the wheels are not limited to electrical motors, and pneumatic or hydraulic actuators may by also used for that purpose.

Furthermore, the right mount 26 includes a right wheel encoder 52. The right wheel encoder 52 detects the rotation angle of the right driving wheel 18 as the rotation amount of the right driving wheel 18. The left mount 28 includes a left wheel encoder 54. The left wheel encoder 54 detects the rotation angle of the left driving wheel 20 as the rotation amount of the left driving wheel 20.

An upper right link 21 and an upper left link 22 are fixed under the body 12. A right swing arm drive motor 60 is fixed on the upper right link 21. The right swing arm drive motor 60 rotationally drives the right swing arm 17 on the rotation axis C4 through a right swing shaft 62. A left swing arm drive motor 64 is fixed on the upper left link 22. The left swing arm drive motor 64 rotationally drives the left swing arm 19 on the rotation axis C5 through a left swing shaft 66.

A passenger seat support mount 72 and a passenger seat drive motor 70 are fixed above the body 12. A passenger seat 74 is rotationally driven on the rotational axis C3 by the passenger seat drive motor 70. That is, the passenger seat drive motor 70 is operated to change the angle of the passenger seat 74 with respect to the body 12. As the angle of the passenger seat 74 is changed, the position of the center of the composite mass composed of the seat and a person or an object is changed in the front-back direction with respect to the body 12. Incidentally, the means for changing the position of the center of the composite mass of the seat and the person or the object can be also realized by a sliding mechanism, a revolving mechanism, or the like, in addition to the mechanism using the rotation axis. Furthermore, the kinetic power of the passenger seat drive motor 70 may be transmitted to the passenger seat 74 through gears, belts, pulleys, and the likes. In the following explanations, the portion that is driven by the passenger seat drive motor 70 is referred as "body portion". The body portion includes the passenger seat 74 or the like. Needless to say, when the moving body includes an actuator to drive the body 12, the body portion includes the body 12.

The rotational axis C3 is parallel to the rotation axes C1 and C2, and located above the rotation axes C1 and C2. The right swing arm 17 is provided between the rotational axis C3 and the rotational axis C1, and the left swing arm 19 is provided between the rotational axis C3 and the rotational axis C2. The right swing arm drive motor 60 rotates the right swing arm 17 on the rotation axis C4, and the left swing arm drive motor 64 rotates the left swing arm 19 on the rotation axis C5. In a normal traveling state, the rotation axes C1-C5 are level with the ground.

A gyro-sensor 48, as well as the passenger seat drive motor 70, the passenger seat support mount 72, and the passenger seat 74 are provided on the body 12. Furthermore, the upper right link 21 and the upper left link 22 are mounted at opposed positions on the body 12.

The body 12 contains a battery module 44, and a sensor 58. The sensor 58 is, for example, an optic sensor for detecting obstacles, and outputs a detection signal upon detection of an obstacle in front of the moving body 100. Furthermore, the sensor 58 may include other sensors in place of or in addition to the sensor for detecting obstacles. For example, an acceleration sensor can be used as one of the sensors 58. Needless to say, more than one sensors may be used as the sensors 58. The sensor 58 detects variations that vary in accordance with the state of the moving body 100. The battery module 44 supplies electrical power to the sensor 58, the gyro-sensor 48, the right wheel drive motor 34, the left wheel drive motor 36, the right swing arm drive motor 60, the left swing arm drive motor 64, the passenger seat drive motor 70, the control portion 80, and the like.

The gyro-sensor 48 is provided on the body 12. The gyro-sensor 48 detects an angular velocity in the inclination angle of the body 12. The term "inclination angle of the body 12" means the degree of the inclination of the position of the center-of-mass of the moving body 100 with respect to the vertical axis extending upwardly from the axles 30 and 32. For example, the inclination angle of the body 12 is defined to be "positive" when the body 12 is inclined forward in the traveling direction of the moving body 100, and defined to be "negative" when the body 12 is inclined backward in the traveling direction of the moving body 100.

Furthermore, in addition to the inclination angle in the traveling direction, an inclination angle velocity in the left-right direction is also measured by using the three-axis (roll, pitch, and yaw) gyro-sensor 48. In this manner, the gyro-sensor 48 measures changes in the inclination angles of the body 12 as the inclination angle velocities of the body 12. Needless to say, the gyro-sensor 48 may be mounted in other places. The inclination angle velocities measured by the gyro-sensor 48 vary in accordance with changes in the posture of the moving body 100. That is, the inclination angle velocities are variations that vary in accordance with the position of the center-of-mass of the body 12 with respect to the positions of the axles. Therefore, when the inclination angles of the body 12 vary abruptly by a disturbance or the like, the inclination angle velocity values become larger.

The passenger seat support mount 72 is provided at or near the center of the body 12. The passenger seat support mount 72 supports the passenger seat 74. That is, the passenger seat 74 is fixed to the body 12 through the passenger seat support mount 72. The passenger seat 74 has a chair-like shape so that the passenger can sit on it.

A manipulation module 46 is provided on the side of the passenger seat 74. A manipulation lever (not shown) and a brake lever (not shown) are provided on the manipulation module 46. The manipulation lever is a manipulation member that is used by the passenger to adjust the traveling velocity and the traveling direction of the moving body 100. The passenger can adjust the traveling velocity of the moving body 100 by adjusting the manipulation amount of the manipulation lever. Furthermore, the passenger can also specify the traveling direction of the moving body 100 by adjusting the manipulation direction of the manipulation lever. The moving body 100 can perform forward movements, stops, backward movements, left turns, right turns, left rotations, and right rotations in accordance with manipulations applied to the manipulation lever. The passenger can put a brake on the moving body 100 by tilting the brake lever. The moving body 100 travels in the direction perpendicular to the axles 30 and 32 in the horizontal plane.

Furthermore, a control portion 80 is mounted on the backrest portion of the passenger seat 74. The control portion 80 controls the traveling (movement) of the moving body 100 by controlling the right wheel drive motor 34 and the left wheel drive motor 36 in such a manner that the right swing arm drive motor 60 follows manipulations carried out on the manipulation module 46 by the passenger. The control portion 80 controls the right wheel drive motor 34 and the left wheel drive motor 36 in accordance with manipulations carried out on the manipulation module 46. In this manner, the right wheel drive motor 34 and the left wheel drive motor 36 are driven at the command values for accelerations and velocities in accordance with manipulations on the manipulation module 46.

The control portion 80 has a CPU (Central Processing Unit), a ROM (Read Only Memory), RAM (Random Access Memory), a communication interface, and the like, and controls various operations of the moving body 100. Furthermore, the control portion 80 carries out various control in accordance with a control program stored, for example, in the ROM. The control portion 80 controls the moving body 100 such that desired accelerations and target velocities are achieved in accordance with the manipulations on the manipulation module 46 and the moving body 100 is maintained at the inverted state. To carry out such control, the control portion 80 controls the right wheel drive motor 34 and the left wheel drive motor 36 by using well-known feedback control such as robust control, state feedback control, and PID control. In this manner, the moving body 100 travels by performing accelerations and decelerations in accordance with the manipulations on the manipulation module 46.

That is, the manipulation module 46 acquires a manipulation amount applied by the manipulation of the passenger, and outputs it to the control portion 80 as a manipulation signal. Then, the control portion 80 calculates target acceleration and/or target velocity of the moving body 100 based on the manipulation signal, and carries out feedback control on the moving body 100 so as to follow the target acceleration and/or the target velocity.

Figure 3:
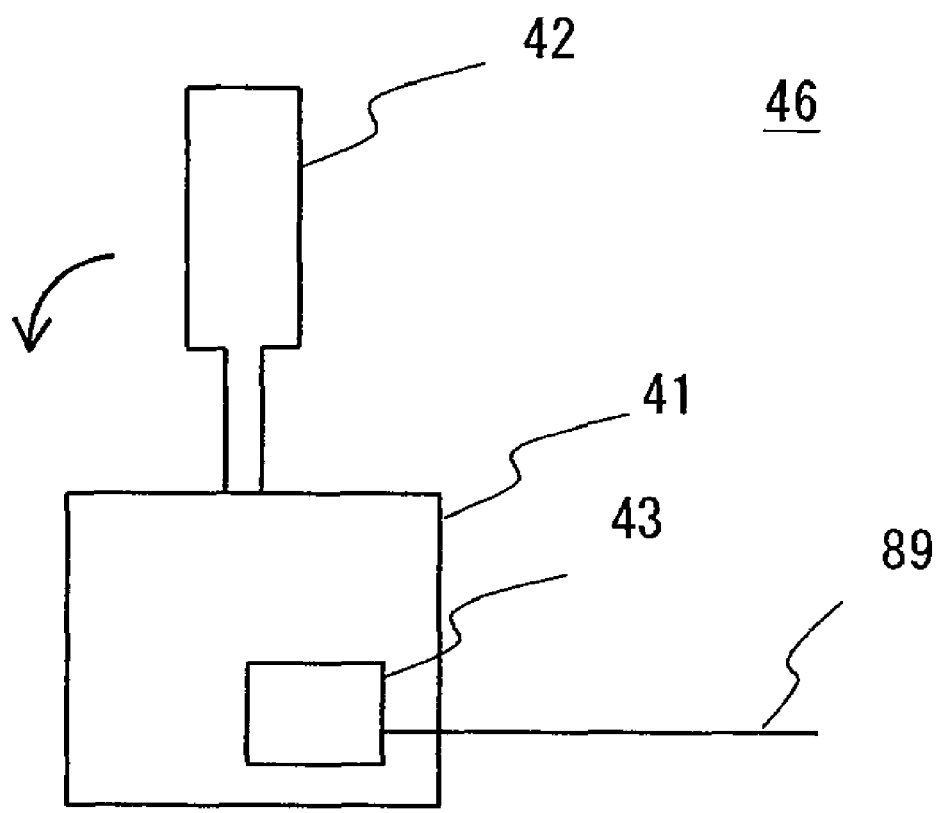
FIG. 3 is a schematic view showing the structure of a manipulation module of a moving body in accordance with an embodiment of the present invention.

The structure of the manipulation module 46 is explained hereinafter with reference to FIG. 3. FIG. 3 is a schematic side view showing the structure of the manipulation module 46, and shows only the structure relating to the manipulation lever. The manipulation module 46 is a joystick type input portion. The manipulation module 46 has a main body portion 41, a manipulation lever 42, and a manipulation angle sensor 43. The main body portion 41 has a box-like shape. The manipulation lever 42 is rotatably mounted on the main body portion 41. The manipulation lever 42 extends upward from the main body portion 41. The manipulation angle sensor 43 is contained within the main body portion 41. Furthermore, the manipulation angle sensor 43 detects the manipulation angle of the manipulation lever 42 with respect to the main body portion 41. That is, the manipulation angle sensor 43 detects the tilt angle of the manipulation lever 42 toward a specific direction from the reference position. When the passenger performs no manipulation on the manipulation module 46, the manipulation lever 42 stands upright with respect to the main body portion 41. That is, the manipulation lever 42 is mounted in the direction perpendicular to the main body portion 41. In this state, the manipulation angle sensor 43 detects that the manipulation angle of the manipulation lever 42 is 0°. Furthermore, when the manipulation lever 42 is manipulated, the manipulation angle sensor 43 outputs the manipulation angle of the manipulation lever 42 as a manipulation signal 89.

When the passenger wants to move the moving body 100, the passenger tilts the manipulation lever 42 in the direction to which the passenger wants to move. For example, when the passenger wants to move the moving body 100 in the forward direction, the passenger tilts the manipulation lever 42 in the forward direction. In this case, the passenger tilts the manipulation lever 42 in the direction indicated by the arrow in FIG. 3. In this manner, the manipulation lever 42 is tilted with respect to the main body portion 41. That is, the angle of the manipulation lever 42 with respect to the main body portion 41 is changed. The manipulation angle sensor 43 detects the manipulation angle of the manipulation lever 42. Incidentally, the manipulation angle sensor 43 may detect the manipulation angle as a positive angle when the manipulation lever 42 is tilted in the forward direction, and detect as a negative angle when the manipulation lever 42 is tilted in the backward direction. The manipulation angle of the manipulation lever 42 corresponds to the manipulation amount that is used to operate the moving body 100. Then, the manipulation angle sensor 43 outputs the detected manipulation angle to the control portion 80 as the manipulation signal 89. The manipulation angle sensor 43 detects the manipulation angle of the manipulation lever 42 periodically with a constant sampling period. This sampling period is established such that it is sufficiently short with respect to the time which the passenger takes to manipulate the manipulation lever 42. Therefore, the manipulation angle is constantly updated while the passenger is tilting the manipulation lever 42.

Incidentally, the manipulation angle sensor 43 is not limited to the sensors that measure the manipulation angle in a direct manner. That is, sensors that measure the manipulation angle in an indirect manner may be also used as the manipulation angle sensor 43. For example, the manipulation angle sensor 43 may be a sensor that detects the position of the manipulation lever 42. In such a case, the manipulation angle is calculated based on the detected position. Furthermore, the manipulation angle sensor 43 may be a sensor that detects the angular velocity in the manipulation angle of the manipulation lever 42. In such a case, the manipulation angle can be obtained by calculating the integral of the angular velocity. Needless to say, the manipulation module 46 may include both a sensor for detecting the manipulation angle of the manipulation lever and a sensor for detecting the angular velocity of the manipulation lever.

As explained above, the manipulation module 46 acquires the manipulation amount from the manipulation angle of the manipulation lever 42. That is, the manipulation angle of the manipulation lever 42 becomes the manipulation amount. Then, the control portion 80 calculates a target velocity based on the manipulation amount. The larger the manipulation angle of the manipulation lever 42 becomes, the higher the target velocity becomes. The manipulation amount is not limited to the manipulation angle, and the angular velocity or the like of the manipulation lever may be used for the manipulation amount. Incidentally, the acceleration and/or the target velocity may be calculated by the manipulation module 46 in itself based on the manipulation amount. In such a case, the acceleration and/or the target velocity are outputted as the manipulation signal 89. Furthermore, a certain area of the manipulation angle of the manipulation lever 42 is defined as a restriction zone. That is, the restriction zone is defined for the manipulation amount. In the restriction zone where the manipulation amount is small, the passenger seat 74 is inclined forward so that the moving body 100 can accelerate speedily. The processes carried out in the control portion 80 are explained later.

The control portion 80 controls the rotation angle of the passenger seat 74 on the axis C3 with respect to the body 12 based on the manipulation amount. The control portion 80 drives only the right driving wheel 18 and the left driving wheel 20 (which are simply called "wheels" hereinafter) in the normal traveling control. Meanwhile, it drives not only the wheels but also the passenger seat drive motor 70 at the beginning of acceleration. That is, it changes the angle of the passenger seat 74 with respect to the body 12. For example, it carries out acceleration start control at the timing at which the moving body 100 accelerates from the stopped state. The state like that where the acceleration start control is carried out for the moving body 100 corresponds to the state where the manipulation lever 42 starts to be tilted from the upright position and the manipulation angle is changed from 0° to a positive or negative value.

Specifically, when the moving body 100 is to accelerate in the forward direction from the stopped state, the passenger tilts the manipulation lever 42 in the forward direction. As a result, the manipulation angle increases from zero to a positive value. On the other hand, when the moving body 100 is to accelerate in the backward direction from the stopped state, the passenger tilts the manipulation lever 42 in the backward direction. As a result, the manipulation angle decreases from zero to a negative value. In an accelerating state, the moving body 100 starts to travel in the manipulation direction with the increase or the decrease of the manipulation angle (manipulation amount) from zero. When the manipulation lever 42 is tilted forward, the moving body 100 moves forward. On the other hand, when the manipulation lever 42 is tilted backward, the moving body 100 moves backward.

Figure 4A:
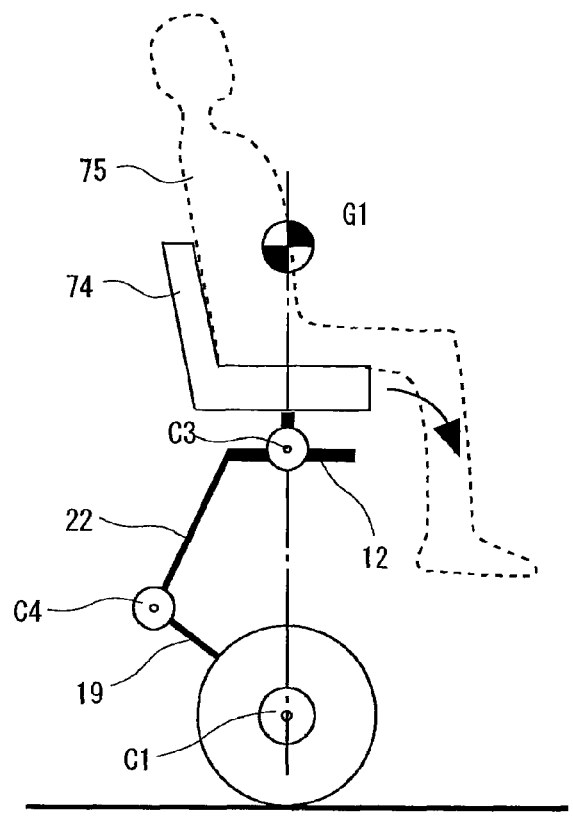
FIGS. 4A and 4B are side views for illustrating postures of a moving body in accordance with an embodiment of the present invention.
Figure 4B:
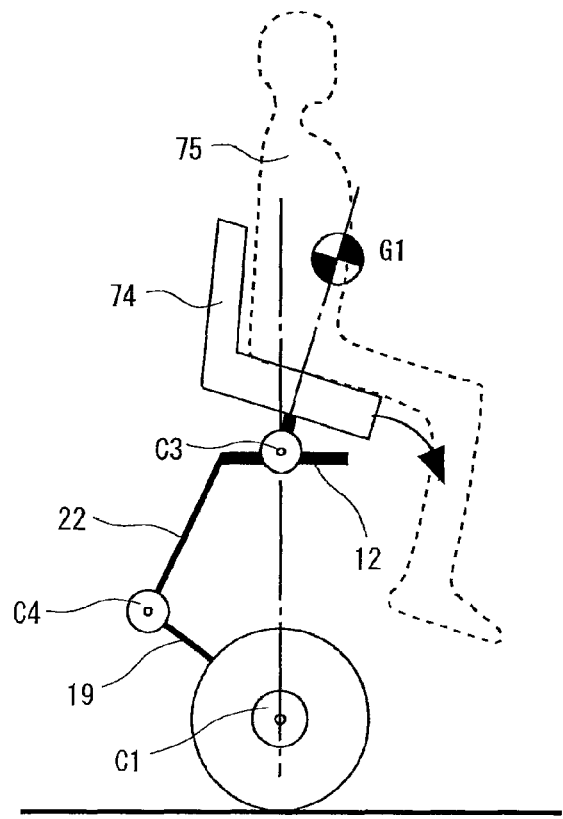
Figure 5A:
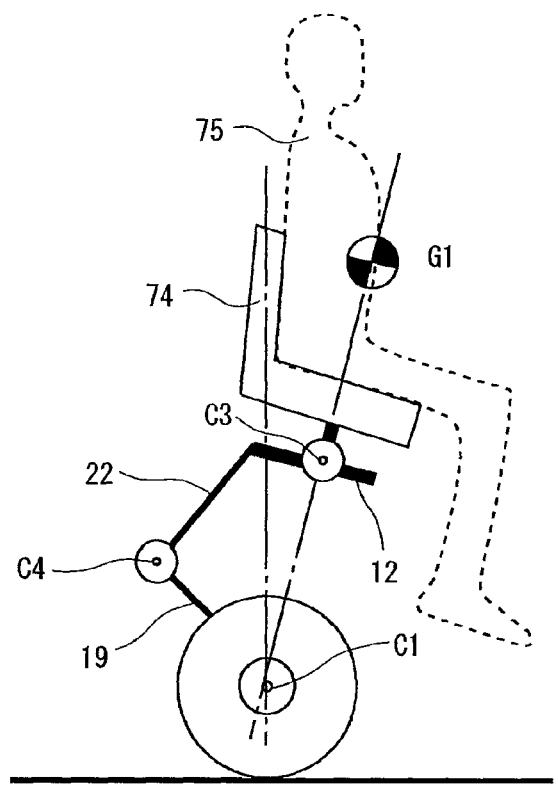
FIGS. 5A and 5B are side views for illustrating postures of a moving body in accordance with an embodiment of the present invention.
Figure 5B:
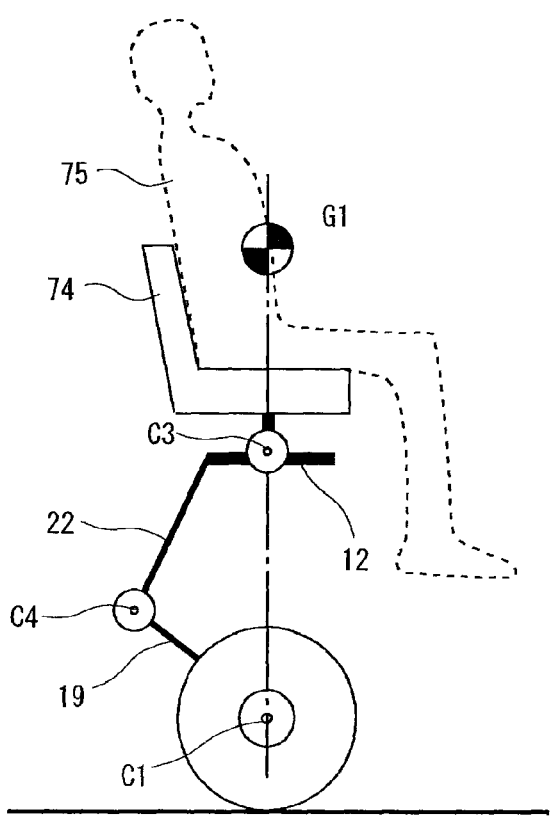

The control portion 80 reduces the delay between when the manipulation is carried out and when the actual movement is actually started by carrying out the acceleration start control. This acceleration start control is explained hereinafter with reference to FIGS. 4A, 4B, 5A, and 5B. FIGS. 4A, 4B, 5A, and 5B are schematic side views showing a series of states of the moving body 100 when the moving body 100 accelerates from a non-acceleration state and carries out constant velocity control. In particular, FIG. 4A shows the moving body 100 in a stopped state. FIG. 4B shows the moving body 100 during the acceleration start control. Specifically, FIG. 4B shows the moving body 100 at the timing at which the manipulation angle of the manipulation lever exceeds the restriction zone. FIG. 5A shows the moving body 100 during the acceleration. Specifically, FIG. 5A shows the moving body 100 after the manipulation angle of the manipulation lever exceeds the restriction zone. FIG. 5B shows the moving body 100 while traveling at a constant velocity. Incidentally, FIGS. 4A, 4B, 5A, and 5B show a case where the moving body 100 moves straight in the forward direction. Therefore, the moving body 100 moves to the right in FIGS. 4A, 4B, 5A, and 5B. Incidentally, although the following explanations are made with an assumption that a passenger 75 is on the passenger seat 74, an object may be placed on the passenger seat 74 instead of the passenger 75.

As shown in FIG. 4A, the moving body 100 stands upright at the stopped state. That is, the center of the composite mass G1 of the body 12, the passenger seat 74, and the passenger 75 is located on the vertical line passing through the rotation axis C1. The rotation angle of the passenger seat 74 around the rotational axis C3 on which the passenger seat 74 is supported in this state is defined to be 0°. The moving body 100 is in the stopped state, and the body 12 is at a standstill. Therefore, the inclination angle velocity measured by the gyro-sensor 48 is not changed. Furthermore, the manipulation angle of the manipulation lever 42 is 0° at the stopped state.

Assume that the passenger tilts the manipulation lever 42 to initiate traveling. The manipulation angle is small immediately after the manipulation lever 42 starts to be tilted. Therefore, the manipulation angle is within the restriction zone. At this point, the passenger seat 74 is rotationally driven in the forward direction on the rotational axis C3 located on the body 12. That is, the passenger seat 74 is rotationally driven and inclined in the direction indicated by the arrow in FIG. 4A with respect to the body 12. As a result, the center of the composite mass G1 of the body 12, the passenger seat 74, and the passenger 75 is located ahead of the vertical line passing through the rotation axis C1 as shown in FIGS. 4A and 4B. At the same time, driving torque is applied to the right driving wheel 18 and the left driving wheel 20 so that the moving body 100 starts to accelerate.

The passenger 75 further pushes the manipulation lever 42 to gradually increase the tilt angle so that the moving body 100 reaches the target velocity. Then, the passenger stops tilting the manipulation lever 42 as the manipulation angle becomes a certain angle. That is, the manipulation angle is getting larger with the passage of time immediately after the start of the operation. Therefore, the manipulation angle becomes larger and exceeds the restriction zone as a certain time passes after the manipulation lever starts to be tilted. The moving body 100 becomes the state shown in FIG. 4B at the timing at which the manipulation angle exceeds the restriction zone. The rotation angle of the passenger seat 74 on the axis C3 with respect to the body 12 in this state is defined as θmax. As explained above, the joint angle increases from 0 to θmax at the beginning of the operation.

The right driving wheel 18 and the left driving wheel 20 continue to be driven even after the manipulation angle of the manipulation lever 42 exceeds the restriction zone. Therefore, the moving body 100 continues to accelerate in the direction in which the target velocity is generated. After the manipulation angle exceeds the restriction zone, the rotation state of the passenger seat 74 on the axis C3 with respect to the body 12 is restored to the original state. That is, the passenger seat drive motor 70 is driven such that the turning motion of the body 12 is restored. After that, the moving body 100 continues to accelerate while the entire body is inclined forward so that the center of the composite mass G1 is maintained at the forward position in the traveling direction. At this point, the upper left link 22 and the upper right link 21 do not need to rotate on the axes C5 and C4 respectively. The moving body 100 continues to accelerate while maintaining the entire body at the angle at which the acceleration of the entire body in the traveling direction is kept in equilibrium with the acceleration in the direction of gravity.

As the moving body 100 reaches the target velocity, the moving body 100 travels at a roughly constant velocity. Therefore, the acceleration in the traveling direction becomes substantially zero. That is, the center-of-mass of the entire body of the moving body 100 is located on the vertical line passing through the rotation axes C1 and C2, and the moving body 100 travels in a roughly upright position. Incidentally, the moving body 100 travels in such a manner that it follows the target velocity that is calculated based on the manipulation angle of the manipulation lever 42. Then, when the manipulation angle is decreased to zero, the moving body 100 reduces the velocity. When the velocity of the moving body 100 is to be reduced, the moving body 100 carries out the decelerating operation while maintaining the entire body at the angle at which the acceleration of the entire body in the opposite direction to the traveling direction, i.e., the deceleration of the entire body is kept in equilibrium with the acceleration in the direction of gravity. At this point, the entire body of the moving body 100 is inclined in the opposite direction to the direction shown in FIG. 5A, i.e., in the opposite direction to the traveling direction.

Figure 6:
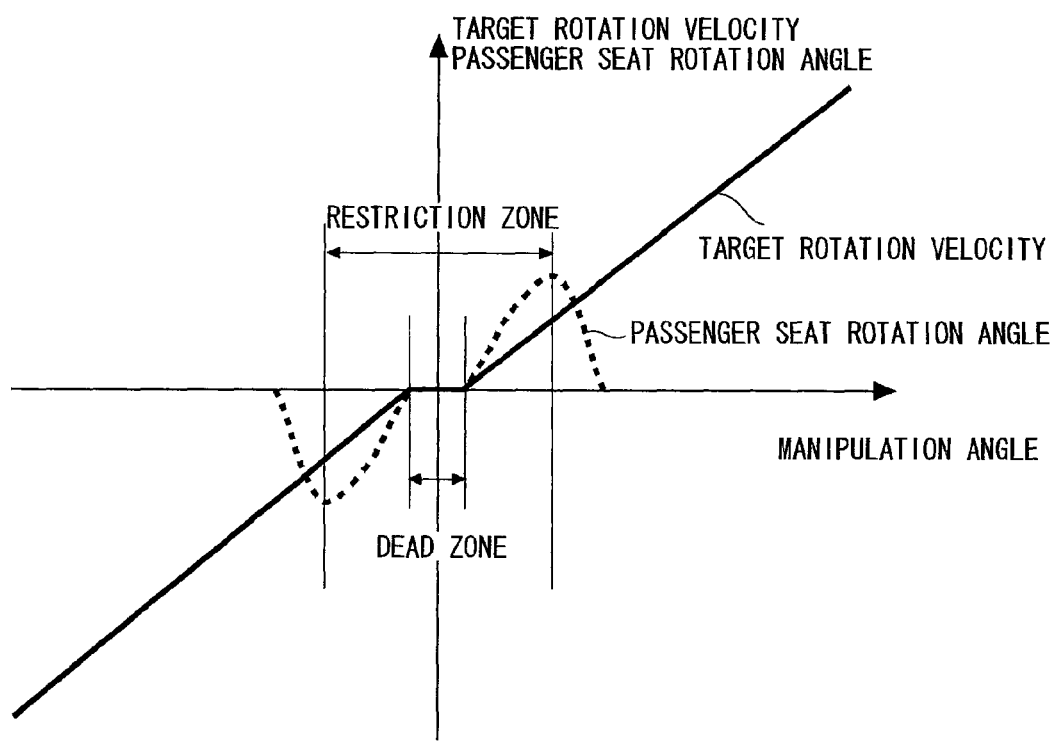
FIG. 6 is a graph showing the relation between the input and the output of a moving body in accordance with an embodiment of the present invention.

The target rotation velocity of the wheels and the rotation angle of the passenger seat 74 with respect to the body 12 in a case where the acceleration control like the one explained above are carried out are explained hereinafter with reference to FIG. 6. FIG. 6 is a graph showing changes in the target rotation velocity of the right driving wheel 18 and the left driving wheel 20 and the rotation angle of passenger seat 74 with respect to the body 12 over the manipulation angle of the manipulation lever 42. In FIG. 6, the horizontal axis indicates the manipulation angle of the manipulation lever 42, and the vertical axis indicates the target rotation velocity of the wheels and the rotation angle of passenger seat 74 with respect to the body 12. In the figure, the rotation angle of passenger seat 74 with respect to the body 12 is shown by the broken line. The target rotation velocity corresponds to the velocity of the moving body 100. In this example, a case where the moving body 100 travels in a straight line is explained for the simplification of the explanation.

As shown in FIG. 6, when the manipulation angle of the manipulation lever 42 is within the restriction zone and outside of the dead zone, the rotation of the passenger seat 74 is carried out while the target rotation velocity is outputted. In this manner, the center of the composite mass G1 of the body 12, the passenger seat 74, and the passenger 75 can be shifted ahead of the vertical line passing through the rotation axis C1. At the same time, the target rotation velocity starts to be outputted for the wheels, and the moving body 100 starts to accelerate. Since the moving body 100 can balance the acceleration of the entire body in the traveling direction with the acceleration in the direction of gravity without any delay, it can immediately start to rotate the driving wheels in the traveling direction without temporally rotating them in the opposite direction to the traveling direction. The dead zone is provided to avoid an accidental operation by the manipulation lever 42 and a malfunction caused by noises. Therefore, the dead zone can be narrowed or even removed in the situation where the chances of accidental operations and noises are small.

Then, the target rotation angle of the passenger seat 74 is increased until the manipulation angle exceeds the restriction zone. When the moving body 100 reaches a certain degree of acceleration, the center-of-mass of the entire body of the moving body 100 is already located ahead of the vertical line passing through the axles. Therefore, even if the rotation of passenger seat 74 with respect to the body 12 is restored to 0°, the moving body 100 can continue to accelerate in the traveling direction. That is, since the moving body 100 maintains the entire body in the forward-inclined posture, the passenger seat 74 does not need to be rotated with respect to the body 12 (FIG. 5A). In this manner, the delay that occurs before the moving body 100 starts to move in response to the input by the passenger 75 can be reduced, and the operability and the response can be improved. Incidentally, the relation between the manipulation angle and the rotation velocity may be non-linear within and/or outside the restriction zone.

Figure 7:
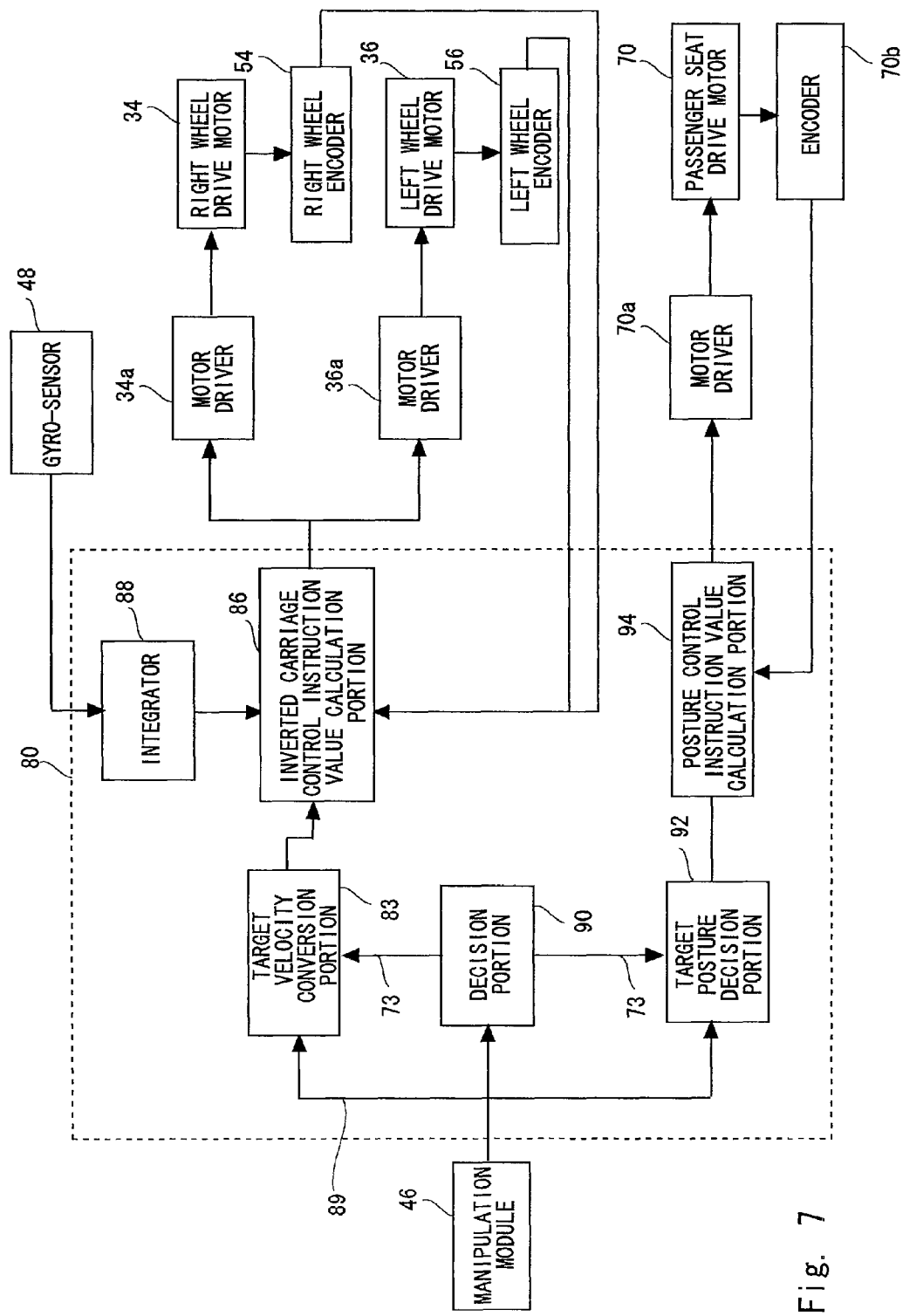
FIG. 7 is a block diagram showing the structure of the control system of a moving body in accordance with an embodiment of the present invention.

Next, control that is carried out by the control portion 80 is explained hereinafter with reference to FIG. 7. FIG. 7 is a block diagram showing the structure of a control system using the control portion 80. Incidentally, the driver for driving the passenger seat drive motor 70 is shown as a motor driver 70a, and the drivers for driving the right wheel drive motor 34 and the left wheel drive motor 36 are shown as motor drivers 34a and 36a respectively in FIG. 7. The control portion 80 carries out feedback control on the right wheel drive motor 34 and the left wheel drive motor 36 such that the moving body 100 moves in accordance with the manipulation angle of the manipulation lever 42 while maintaining the moving body at the inverted state. Furthermore, it also carries out feedback control on the passenger seat drive motor 70 such that the passenger seat 74 is rotated to a specific rotation angle with respect to the body 12.

The manipulation signal 89 is inputted from the manipulation module 46 to a decision portion 90. The manipulation signal 89 has a value corresponding to the manipulation angle of the manipulation lever 42. The decision portion 90 determines whether it is larger than the dead zone or not based on the manipulation signal 89. Specifically, when the manipulation amount exceeds a threshold value, it determines the manipulation angle is larger than the dead zone and outputs a decision signal 73 indicating that the manipulation angle is larger than the dead zone. The decision signal 73 indicating that the manipulation angle is larger than the dead zone is inputted to a target velocity conversion portion 83 and a target posture decision portion 92. The output of the decision signal 73 indicates that the moving body 100 needs to travel, and therefore the acceleration control is carried out. Furthermore, the decision portion 90 also determines whether it is within the restriction zone or not based on the manipulation signal 89 in a similar manner. That is, the decision portion 90 compares the manipulation signal 89 with a threshold value, and determines whether it is within or outside of the restriction zone.

First of all, the posture control of the passenger seat 74 is explained hereinafter. The decision signal 73 and the manipulation signal 89 are inputted to the target posture decision portion 92. The target posture decision portion 92 determines the target rotation angle of the passenger seat 74 based on the decision signal 73 and the manipulation signal 89. That is, when the manipulation angle of the manipulation lever 42 is outside of the dead zone and within or near the restriction zone, the target posture decision portion 92 outputs the target rotation angle of the passenger seat 74 with respect to the body 12. Specifically, when the decision signal is inputted to the target posture decision portion 92, the target posture decision portion 92 outputs the target rotation angle based on the manipulation signal 89. At this point, the target posture decision portion 92 outputs a target rotation angle like the one shown by the broken line in FIG. 6 as the target rotation angle of the passenger seat 74. A posture control command value calculation portion 94 drives the passenger seat drive motor 70 through the motor driver 70a based on the target rotation angle from the target posture decision portion 92. That is, the posture control command value calculation portion 94 carries out feedback control on the passenger seat 74 such that it follows the target rotation angle. In this example, the control portion 80 carries out the feedback control based on a signal from an encoder 70b that detects the rotation angle of the passenger seat drive motor 70. In this manner, the passenger seat 74 takes the forward-inclined posture when the manipulation angle of the manipulation lever 42 is outside of the dead zone and within or near the restriction zone. Then, the center of the composite mass G1 of the body 12, the passenger seat 74, and the passenger 75 can be shifted ahead of the vertical line passing through the rotation axis C1 in the traveling direction.

Next, the traveling control of the moving body 100 is explained hereinafter. The decision signal 73 and the manipulation signal 89 from the manipulation module 46 are inputted to the target velocity conversion portion 83. The manipulation signal 89 has a value corresponding to the manipulation angle of the manipulation lever 42. The target velocity conversion portion 83 determines the target velocity of the moving body 100 based on the decision signal 73 and the manipulation signal 89. Specifically, when the decision signal 73 is inputted to the target velocity conversion portion 83, the target velocity conversion portion 83 outputs the target velocity based on the manipulation signal 89. At this point, the target velocity conversion portion 83 outputs a target velocity like the one shown by the solid line in FIG. 6 as the target velocity of the moving body 100. An inverted carriage command value calculation portion 86 controls the driving of the motor drivers 34a and 36a and the right wheel drive motor 34 and the left wheel drive motor 36 so as to follow the target velocity. Then, it carries out feedback control on the moving body 100 so as to follow the target velocity based on signals from a right wheel encoder 52 and a left wheel encoder 54, both of which are attached to their respective motors. Incidentally, the current velocity of the moving body 100 can be obtained by calculating the derivative values of signals from the right wheel encoder 52 and the left wheel encoder 54 and converting them into the velocity of the center of the carriage, or similar calculations. Furthermore, the control portion 80 also carries out the control for the inverted state at the same time so that the moving body 100 does not fall over.

The control for the inverted state of the moving body 100 is carried out based on the inclination angle velocity of the body 12 measured by the gyro-sensor 48. The inclination angle of the body 12 is obtained by integrating the inclination angle velocity of the body 12 by an integrator 88. The inclination angle velocity may be measured by using other measuring means such as an inclination angle meter. The target velocity conversion portion 83 also calculates a target inclination angle corresponding to the target velocity. Typically, this is established in accordance with acceleration or deceleration. The inverted carriage command value calculation portion 86 calculates a torque command value in relation to the translational movement of each wheel based on the inclination angle and the current velocity. Specifically, it calculates the velocity deviation between the target velocity and the current velocity in the translation direction. Furthermore, it also calculates the angular deviation between the target inclination angle and the current inclination angle. It calculates the torque command value such that these two deviations are minimized. For example, the velocity deviation is multiplied by an appropriate feedback gain K1. Furthermore, the angular deviation is multiplied by an appropriate feedback gain K2. Then, the value obtained by adding these multiplied values together is outputted as the torque command value in the translation direction. Incidentally, the H∞ control theory or other publicly-known modern control theories such as H2 control theory and μ-design method may be used as an embodiment of the inverted carriage command value calculation portion 86.

In an accelerating state, the passenger seat 74 firstly inclines forward, and starts to accelerate. When the acceleration of the moving body 100 reaches a certain magnitude, the passenger seat 74 is restored from the forward-inclined posture and the entire body is inclined forward so that it can continue to accelerate. After that, if the moving body 100 is to travel at a constant velocity, it travels without inclining the body 12 in the forward direction. The target velocity conversion portion 83, the inverted carriage command value calculation portion 86, the motor driver 34a, the motor driver 36a, and the like constitute a first control portion that carries out the feedback control on the right wheel drive motor 34 and the left wheel drive motor 36 such that it follows the target control value corresponding to the manipulation amount. Furthermore, the target posture decision portion 92, the posture control command value calculation portion 94, the motor driver 70a, and the like constitute a second control portion that controls the passenger seat drive motor 70 such that it turns the body 12 in accordance with the manipulation amount when the manipulation amount does not exceed the threshold value, and restores the body 12 from the turned state after the manipulation amount exceeds the threshold value.

The control portion 80 also controls the revolving direction of the moving body 100. To that end, an additional dimension of movement is added to the manipulation lever 42 so that it can indicate the revolving direction to the manipulation module 46. For example, the joystick is configured to tilt in the transverse direction. Alternatively, it may be configured to be twisted or rotated, and its manipulation signal may be used as the target revolution angle. The moving body 100 calculates the current revolution angle from signals outputted from the right wheel encoder 52 and the left wheel encoder 54. The revolution angle deviation between the target revolution angle and the current revolution angle is obtained. Then, the obtained deviation is multiplied by appropriate feedback gains to convert it into command torque values for the right driving wheel 18 and the left driving wheel 20, and they are further converted into the output values of the inverted carriage command value calculation portion 86. In this manner, the moving body 100 can also perform revolving movements (not shown).

Figure 8:
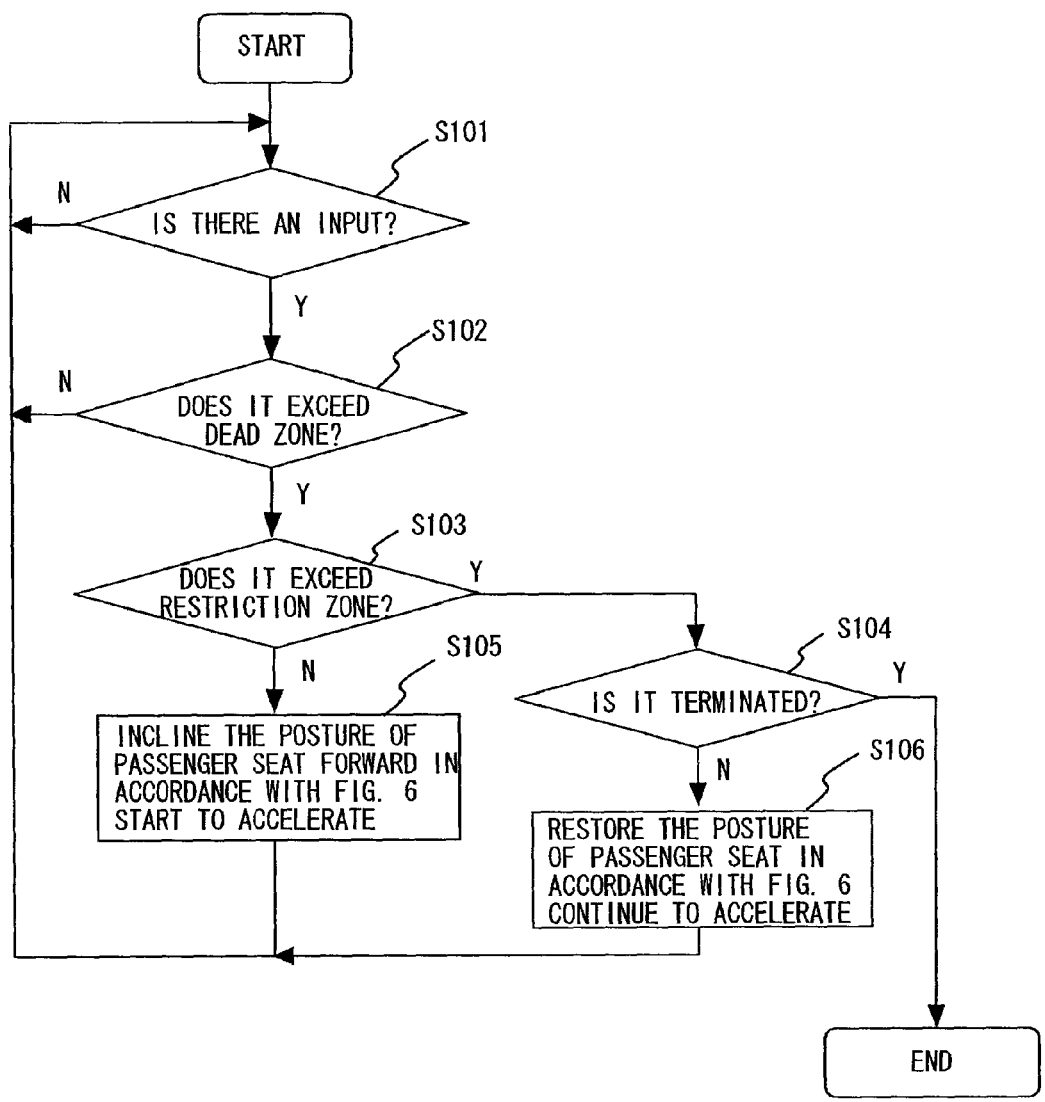
FIG. 8 is a flowchart showing a control method of a moving body in accordance with an embodiment of the present invention.

Next, a method of controlling a moving body in accordance with this embodiment of the present invention is explained hereinafter with reference to FIG. 8. FIG. 8 is a flowchart showing a control method of a moving body in accordance with this embodiment of the present invention. In particular, FIG. 8 shows a control method of the moving body 100 when it starts operation. That is, FIG. 8 shows a series of processes in which the moving body 100 starts to move from the stopped state.

The process starts from the state shown in FIG. 4A. Firstly, it determines whether there is an input to the manipulation module 46 or not (step S101). It further determines whether the inputted value exceeds the dead zone or not (step S102). When it is determined that the inputted value exceeds the dead zone, the inputted value is determined to be effective. Then, the process proceeds to the next step, and it determines whether the inputted value exceeds the restriction zone or not (step S103). When the inputted value is determined to be within the restriction zone, the passenger seat 74 is inclined forward in accordance with the relation shown in FIG. 6. That is, the passenger seat 74 is rotationally driven in the forward direction on the rotational axis C3 located on the body 12, so that it is inclined with respect to the body 12 (step S105). In this manner, the composite mass G1 of the body 12, the passenger seat 74, and the passenger 75 with respect to the body 12 can be shifted ahead of the vertical line passing through the rotation axis C1 as shown in FIG. 4B. At the same time, driving torque is applied to the right driving wheel 18 and the left driving wheel 20 so that the moving body 100 starts to accelerate (step S105). Then, the above-described processes are repeated until the inputted value exceeds the restriction zone.

Then, when the inputted value from the manipulation module 46 exceeds the restriction zone, it determines whether the operation is terminated or not (step S104). The termination of the operation can be detected by, for example, determining that the inputted value from the manipulation module 46 is returned within the dead zone, or a similar process. When the operation is not terminated, the passenger seat 74 is restored from the inclined position in accordance with the relation shown in FIG. 6. At the same time, the velocity command value of the moving body 100 is provided in accordance with the relation shown in FIG. 6. The moving body 100 travels such that is follows to the target velocity while maintaining the control for the inverted state (step S106). Then, when the moving body 100 completes the acceleration stage and enters a constant velocity stage, it travels while taking the posture shown in FIG. 5B. When the manipulation amount is reduced, the moving body 100 decelerates in accordance with the manipulation amount. Then, when it finally determines that the operation is terminated (step S104), the series of the actions are completed.

Incidentally, although a target velocity is established as the travel control target value that is used to move the moving body in accordance with the manipulation amount in the above explanations, it is not limited to such examples. For example, a target rotation velocity for the left wheel drive motor 36 and the right wheel drive motor 34 may be used as the travel control target value. Alternatively, an acceleration value for the moving body 100 may be used as the travel control target value. Furthermore, a target position may be also used as the travel control target value. Needless to say, other values may be also established as the travel control target value in place of or in combination with these values. In this manner, the feedback control can be carried out in accordance with the difference between the travel control target value and the current value that is measured by using a sensor or the like. The travel control target value like the one described above is calculated in accordance with the manipulation amount. In this manner, the moving body 100 moves in accordance with the manipulation amount. That is, the feedback control is carried out so as to follow the travel control target value.

Furthermore, the inverted-state control target value is not limited to the inclination angle of the body 12. For example, the inclination angle velocity of the body 12 may be used as the inverted-state control target value. Needless to say, other values may be also established as the inverted-state control target value in place of or in combination with these values. In this manner, the feedback control can be carried out in accordance with the difference between the inverted-state control target value and the current value that is measured by using a sensor or the like. That is, the feedback control should be carried out so as to follow the inverted-state control target value that is used to maintain the inverted state.

Since the travel control target value and the inverted-state control target value are not independent and relate to each other in the control of an inverted moving body, these two target values, when being individually established, cannot be completely satisfied simultaneously. The compliances to these target values can be prioritized at least to some degree by adjusting the weight of a feedback gain for the travel control and the weight of a feedback gain for the inverted-state control. However, since maintaining the inverted state is the absolute requirement, the priority that is given to the travel control target value has some limitation. Accordingly, by shifting the center-of-mass of the passenger seat by using the above-described control, the inverted-state control can be achieved while satisfying the travel control target value simultaneously. That is, the center-of-mass is brought forward in the traveling direction by inclining the passenger seat at the beginning of acceleration at which the manipulation amount is within the restriction zone. In this manner, the compliance to the travel control target value becomes possible while satisfying conditions for the inverted state, and therefore response to the travel control can be improved. Therefore, it can accelerate speedily in response to the operation, and therefore the response is improved.

Incidentally, although the operation is carried out with the manipulation angle of the manipulation lever in the above explanations, it is not limited to such examples. That is, other manipulation means for obtaining the manipulation amount in response to the manipulation by an operator can be used for that purpose. For example, a button-type manipulation means can be used for that purpose. In such a case, the depressing force on the button is measured by a force sensor or the like. Then, the manipulation amount is obtained in accordance with the depressing force. As explained above, the only necessary requirement for the manipulation module 46 is that it must be able to change the magnitude of the input by the manipulation of an operator. Then, the restriction zone is established for the manipulation amount of the manipulation module 46. Furthermore, the manipulation amount may be obtained by the weight shift of a passenger. For example, when the passenger wants to move to the forward direction, the passenger shifts his/her weight forward. That is, the passenger leans forward on the passenger seat. In this manner, the inclination angle of the body 12 is changed. This change in the inclination angle is measured by a gyro-sensor or the like. That is, the manipulation amount can be obtained in accordance with the magnitude of the angular velocity in the pitch axis.

Although the two wheel type moving body 100 is explained in this embodiment of the present invention, the number of wheels is not limited to such examples. The present invention is also applicable to one wheel type moving bodies, or to moving bodies having more than two wheels. Needless to say, two or more than two arms may be used to constitute the swing arm. The joint that drives the passenger seat is not limited to rotary joints. For example, a slide joint may be used for that purpose. In such a case, the slide joint changes the position of the center-of-mass of the passenger seat 74 and the passenger 75 by sliding the passenger seat 74 in the front-back direction. Furthermore, a movement to the backward direction can be also controlled in a similar manner to the movement to the forward direction.

Although the moving body 100 is explained with the assumption that an operator is on the moving body 100 in the above-described examples, the present invention is not limited to such examples. For example, the present invention is also applicable to a moving body that is operated by remote control. Furthermore, although the moving body 100 having the passenger seat 74 is explained in the above-described examples, the present invention is also applicable to a moving carriage for transporting objects. Needless to say, the present invention is also applicable to mobile robots and similar moving bodies.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An inverted wheel type moving body to travel in accordance with a manipulation amount manipulated by an operator comprising:
    a chassis to rotatably support at least one wheel;
    a first drive portion to rotatably drive the wheel;
    a body portion rotatably supported on the chassis through a support member;
    a second drive portion that moves a relative position of the body portion with respect to the chassis in front and back directions from an initial position by driving the body portion, each of the front and back directions being a direction to which the moving body is movable;
    a decision portion to determine whether the manipulation amount exceeds a restriction zone defined by a threshold value;
    a first control portion to carry out feedback control on the first drive portion such that the first drive portion follows a target control value corresponding to the manipulation amount while maintaining the inverted wheel type moving body at the inverted state, the target control value being correlated with a target velocity or a target acceleration of the moving body; and
    a second control portion to control the second drive portion such that the relative position of the body portion moves in the same direction with a moving direction of the moving body according to the manipulation amount, the moving direction of the moving body being the front direction or the back direction and determined based on the manipulation amount,
    wherein, while the manipulation amount is within the restriction zone, the second driving portion inclines the body portion increasingly forward with a forward-moving manipulation amount and inclines the body portion increasingly backward with a backward-moving manipulation amount, such that the greatest forward inclination angle of the body portion occurs at a forward edge of the restriction zone and the greatest backward inclination angle of the body portion occurs at a backward edge of the restriction zone,
    wherein, while the manipulation amount exceeds the restriction zone, the second driving portion drives the body portion so as to return the relative position of the body portion to the initial position, and
    wherein, while the manipulation amount exceeds the restriction zone, the first control portion controls the first drive portion such that the moving body follows the target velocity or the target acceleration, which increases in proportion to the manipulation amount.

2. A method of controlling an inverted wheel type moving body, the inverted wheel type moving body including a chassis to rotatably support at least one wheel, a first drive portion to rotatably drive the wheel, a body portion rotatably supported on the chassis through a support member, and a second drive portion that moves a relative position of the body portion with respect to the chassis in front and back directions from an initial position by driving the body portion, each of the front and back directions being a direction to which the moving body is movable the inverted wheel type moving body carrying out feedback control on the first drive portion such that the first drive portion follows a target control value corresponding to the manipulation amount while maintaining the inverted wheel type moving body at the inverted state, the target control value being correlated with a target velocity or a target acceleration of the moving body, the method comprising:

moving the relative position of the body portion in the same direction with a moving direction of the moving body according to the manipulation amount by controlling the second drive portion, the moving direction of the moving body being the front direction or the back direction and determined based on the manipulation amount, determining whether the manipulation amount exceeds or not a restriction zone defined by a threshold value;

controlling, while the manipulation amount is within the restriction zone, the second driving portion to incline the body portion increasingly forward with a forward-moving manipulation amount and to incline the body portion increasingly backward with a backward-moving manipulation amount, such that the greatest forward inclination angle of the body portion occurs at a forward edge of the restriction zone and the greatest backward inclination angle of the body portion occurs at a backward edge of the restriction zone;

while the manipulation amount exceeds the restriction zone, controlling the second drive portion such that the relative position of the body portion returns to the initial position, and while the manipulation amount exceeds the restriction zone, controlling the first drive portion such that the moving body follows the target velocity or the target acceleration, which increases in proportion to the manipulation amount.

3. The inverted wheel type moving body according to claim 1, wherein the first drive portion initiates to drive the wheel in synchronization with beginning driving the body portion by the second drive portion.

4. The inverted wheel type moving body according to claim 1, wherein
the body portion comprises a passenger seat being adapted to support the operator, and
the body portion comprises a rotational joint being adapted to tilt the passenger seat in the front or back directions, and moves a relative portion of the passenger seat with respect to the chassis via the rotational joint.

5. The inverted wheel type moving body according to claim 1, wherein
the body portion comprises a passenger seat being adapted to support the operator, and
the body portion comprises a direct-acting joint being adapted to slide the passenger seat in the front or back directions, and moves a relative portion of the passenger seat with respect to the chassis via the direct-acting joint.

6. The method according to claim 2 further comprising controlling the first drive portion so as to initiate to drive the wheel in synchronization with beginning driving the body portion by the second drive portion.

7. The method according to claim 2, wherein
the body portion comprises a passenger seat being adapted to support the operator, and
the body portion comprises a rotational joint being adapted to tilt the passenger seat in the front or back directions, and
the moving the relative position of the body portion includes moving a relative portion of the passenger seat with respect to the chassis via the rotational joint.

8. The method according to claim 2, wherein
the body portion comprises a passenger seat being adapted to support the operator, and
the body portion comprises a direct-acting joint being adapted to slide the passenger seat in the front or back directions, and the moving the relative position of the body portion includes moving a relative portion of the passenger seat with respect to the chassis via the direct-acting joint.

9. The inverted wheel type moving body according to claim 1, wherein
the body portion comprises a seat being adapted to support an object; and
the body portion comprises a rotational joint being adapted to tilt the seat in the front or back directions, and moves a relative portion of the seat with respect to the chassis via the rotational joint.

* * * * *